United States Patent [19]

Kimura et al.

[11] Patent Number: 5,434,890

[45] Date of Patent: Jul. 18, 1995

[54] METHOD OF TRANSMITTING A DIGITAL SIGNAL, DIGITAL SIGNAL TRANSMISSION AND RECEPTION APPARATUS AND DIGITAL SIGNAL TRANSMISSION APPARATUS

[75] Inventors: Hiromasa Kimura, Tokyo; Yoshiharu Ohsaki, Yokohama; Susumu Unosawa, Tokyo; Seiho Kitaji, Yokohama, all of Japan

[73] Assignee: Matsushita Electric Industrial Co., Ltd., Osaka, Japan

[21] Appl. No.: 207,417

[22] Filed: Mar. 8, 1994

[30] Foreign Application Priority Data

Mar. 12, 1993 [JP] Japan .................................. 5-052427

[51] Int. Cl.⁶ .......................... H04L 7/06; H04J 3/06; H04J 3/12; H04J 3/24
[52] U.S. Cl. .................... 375/305; 370/100.1; 370/105.1; 370/94.1
[58] Field of Search ................... 370/100.1, 102, 105.1, 370/94.1, 94.2; 375/114

[56] References Cited

U.S. PATENT DOCUMENTS

| | | | |
|---|---|---|---|
| 5,172,376 | 12/1992 | Chopping | 370/100.1 |
| 5,245,636 | 9/1993 | Sari | 375/118 |
| 5,268,936 | 12/1993 | Bernardy | 375/118 |
| 5,331,630 | 7/1994 | Fujita | 370/58.1 |
| 5,335,223 | 8/1994 | Iino | 370/65.5 |

OTHER PUBLICATIONS

H. Kimura et al, "A Study of Methods for Video Transmission Based on SDH," Collection of Speech Papers at the Meeting held on Spring 1992 by the Institute of Electronics, Information and Communication Engineers of Japan, Paper B-710.

Kohhei Ohtake, "Jitter Characteristics in Multiplexing-Demultiplexing System Using Pulse Stuffing Synchronization," Paper vol. 58, No. 8 (1975), Part A, pp. 538-545 edited by the Institute of Electronics, Information and Communication Engineers of Japan.

Kiyohiro Yuki, "Effect of Jitter on CTV Signals in PCM Transmission Systems," Paper vol. 57, No. 4 (1974), Part A, pp. 287-294 edited by the Institute of Electronics, Information and Communication Engineers of Japan.

H. Kimura et al, "A Development for High Quality Video Transmission System based on SDH," ITEJ Technical Report vol. 16, pp. 61-66, Oct. 1992.

Keizo Kato et al, "High Quality Video-Transmission System Based on SDH," Collection of Speech Papers at the Meeting held on Spring 1991 by the Institute of Electronics, Information and Communication Engineers of Japan, Paper B-716.

Taizou Kinoshita et al, "A Study for 600 Mb/s HDTV Transmission System in B-ISDN," National Convention of the Institute of Television Engineers of Japan, 1989, pp. 265-266.

Primary Examiner—Edward L. Coles, Sr.
Assistant Examiner—John Ning
Attorney, Agent, or Firm—Stevens, Davis, Miller & Mosher

[57] ABSTRACT

In a transmitting apparatus, information signal frame position information is supplied from a transmission line frame control unit in a frame constructing unit to an information signal frame control unit provided within a frame constructing unit. In a reception apparatus, information signal frame position information is supplied from transmission line frame control unit provided within a frame analyzing unit to an information signal frame synchronization detection protecting unit provided within a frame analyzing unit. n information signal frames having a length which results from dividing the data area of the transmission line frame by n are located at an arbitrary position within the data area of the transmission line frame and a stuff control is effected on every information signal frame. Also, a value of n which yields a stuff ratio in which a residual jitter can be prevented from being increased is selected by transmitting a single information signal by using n information signal frames.

5 Claims, 13 Drawing Sheets

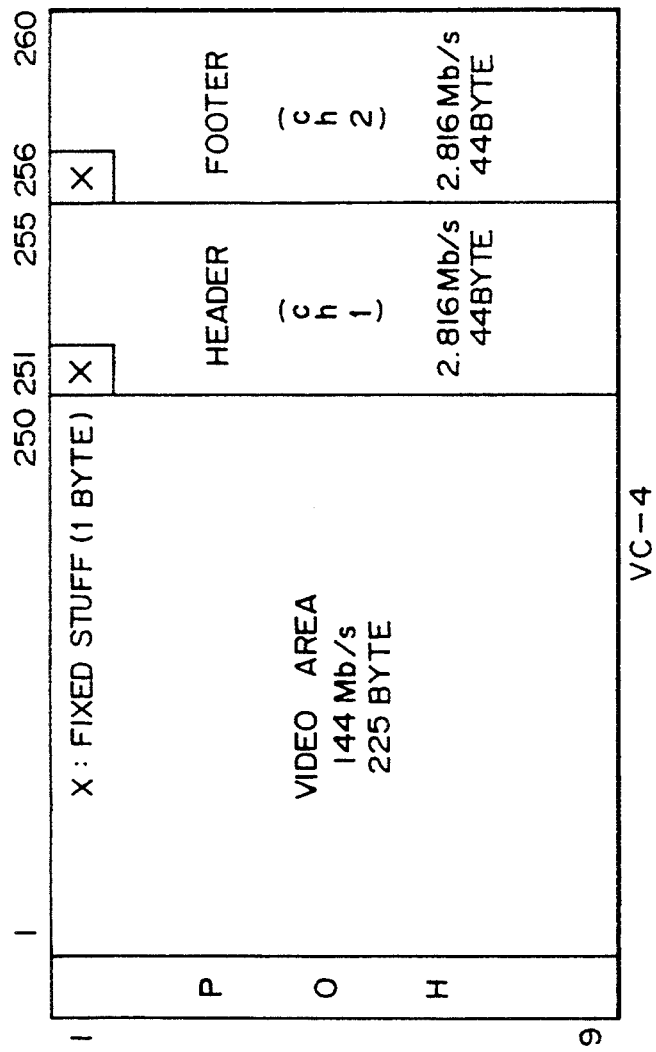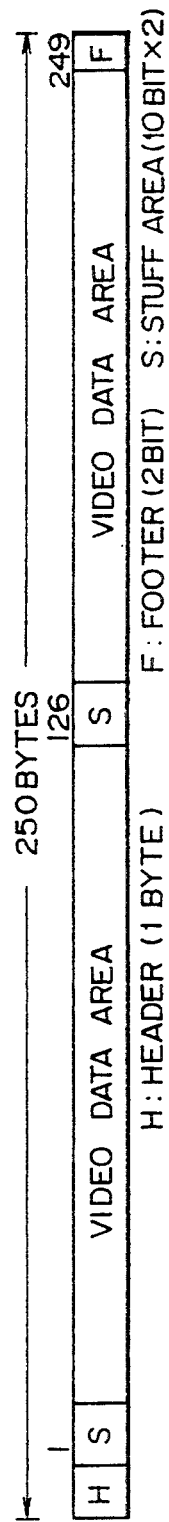
FIG. 14 PRIOR ART
FIG. 15 PRIOR ART

METHOD OF TRANSMITTING A DIGITAL SIGNAL, DIGITAL SIGNAL TRANSMISSION AND RECEPTION APPARATUS AND DIGITAL SIGNAL TRANSMISSION APPARATUS

BACKGROUND OF THE INVENTION

The present invention relates to a method of transmitting a digital signal, a digital signal transmission and reception apparatus, and a digital signal transmission apparatus.

The SDH (Synchronous Digital Hierarchy) network of broad band that is based on the CCITT (Comité Consultatif Internationale Telegraphique et Telephonique) is constructed now. A demand for video transmission services of high quality has increased recently. Concurrently therewith, it is proposed to use the SDH network as a transmission line of such high-quality video transmission services (e.g., Collection of Speech Papers at the Meeting held on Spring 1992 by the Institute of Electronics, Information and Communication Engineers of Japan, Paper B-710).

FIGS. 6 and 10 of the accompanying drawings show examples of two kinds of formats of the transmission frame according to the conventional transmission method in a transmission line based on the synchronous digital hierarchy (SDH) network. FIG. 7 shows an example of an apparatus which transmits a video signal as an information signal by using the method shown in FIG. 6. FIG. 11 shows an example of an apparatus which similarly transmits the video signal by using the method shown in FIG. 10.

As shown in FIG. 6, there are provided a transmission line header 51 and an information signal header 52 which includes stuff control information. There is provided information signal data area 53 which includes a stuff word 54 (10-bit length). The information signal header, the information signal data area and a reserve area 57 for future expansion constitute an information signal frame 55 which simultaneously corresponds to a data area of a transmission line. The transmission header 51, the information signal header 52, the information signal data area 53, the stuff word 54 and the information signal frame 55 constitute a transmission line frame 56.

As shown in FIG. 7, there is provided an input terminal 1 to which a video signal is input as an information signal. The video signal applied to the input terminal 1 is converted by an analog-to-digital (A/D) converting unit 2 in the form of analog to digital signal. The output digital video signal from the A/D converting unit 2 is supplied to an information frame constructing unit 3. The output signal from the information signal frame constructing unit 3 is supplied to a transmission line frame constructing unit 4. The information signal frame constructing unit 3 and the transmission line frame constructing unit 4 constitute a transmission apparatus 32. There is shown a transmission line 5 whose transmission signal format is based on the above-mentioned synchronous digital hierarchy (SDH) network. The signal from the transmission apparatus 32 is supplied to a transmission line frame analyzing unit 6. The output signal from the transmission line frame analyzing unit 6 is supplied to an information signal frame analyzing unit 7. The transmission line frame analyzing unit 6 and the information signal frame analyzing unit 7 constitute a reception apparatus 33. The output signal from the reception apparatus 33 is supplied to a digital-to-analog (D/A) converting unit 8, in which it is converted from a digital to an analog signal. The analog video signal thus converted is delivered from an output terminal 9 as an information signal.

FIG. 8 shows an arrangement of the transmission apparatus 32 shown in FIG. 7. As shown in FIG. 8, there is provided an input terminal 10 to which a digitized information signal is input. The digitized information signal applied to the input terminal 10 is supplied to an information signal speed converting unit 11, in which it is converted in speed. The output signal from the information signal speed converting unit 11 is supplied to an information signal header synthesizing unit 12. Also, there is provided a stuff control unit 13. The information signal speed converting unit 11, the information signal header synthesizing unit 12 and the stuff control unit 13 constitute the information signal frame constructing unit 3. An interface signal speed converting unit 15 converts a speed of an information signal supplied thereto, and supplies the information signal thus converted to a transmission line header synthesizing unit 16. An interface signal clock generating unit 17 is formed of some suitable means, such as a subsidiary oscillator or the like. There is shown a transmission line frame control unit 18. A transmission line clock generating unit 19 is formed of an independent oscillator. The interface signal speed converting unit 15, the transmission line header synthesizing unit 16, the interface signal clock generating unit 17, the transmission line frame control unit 18 and the transmission line clock generating unit 19 constitute the transmission line frame constructing unit 4. The output of the transmission line frame constructing unit 4 is delivered from a transmission line output terminal 20.

FIG. 9 shows an arrangement of the reception apparatus 33 shown in FIG. 7. As shown in FIG. 9, there are provided a transmission line input terminal 21, a transmission line frame synchronization detection protecting unit 22 and a transmission line frame control unit 23. An interface signal speed converting unit 24 effects the speed conversion on the input signal to output an interface signal. An interface signal clock generating unit 25 is formed of some suitable means, such as a subsidiary oscillator or the like. The transmission line frame synchronization detection protecting unit 22, the transmission line frame control unit 23, the interface signal speed converting unit 24 and the interface signal clock generating unit 25 constitute the transmission line frame analyzing unit 6. There is shown a stuff control unit 28. An information signal speed converting unit 29 effects the speed conversion on the input signal to output an information signal. An information signal clock generating unit 30 is formed of some suitable means, such as a subsidiary oscillator or the like. The stuff control unit 28, the information signal speed converting unit 29 and the information signal clock generating unit 30 constitute the information signal frame analyzing unit 7. The output signal from the information signal frame analyzing unit 7 is delivered from a digital information output terminal 31.

As shown in FIG. 10, there is provided an information signal header 61 which includes frame synchronizing information of the information signal and stuff control information, though not shown. There is provided an information signal data area 62 which includes 2 words of stuff words (10-bit length) 63, 64. The information signal header 61, the information signal data area and the stuff words 63, 64 constitute a 250-byte information signal frame 65. There are provided a transmission line header 66 and a transmission line data area 67. The transmission line data area 67 includes therein a reserve area 69 that is used for future expansion. The information signal frame 65 is located in the transmission line data area 67 at its arbitrary position except the portion of the reserve area 69. The transmission line header 66 and the transmission line data area 67 constitute a transmission line frame 68.

A transmission apparatus shown in FIG. 11 is different from the transmission apparatus shown in FIG. 7 only in the arrangements of the transmission apparatus 32 and the reception apparatus 33. As shown in FIG. 12 which illustrates the arrangement of the transmission apparatus 32, there is shown an information signal frame control unit 14. As shown in FIG. 13 which illustrates the arrangement of the reception apparatus 33, there are provided an information signal frame synchronization detection protecting unit 26 and an information signal frame control unit 27. A remainder of the arrangements is fundamentally the same as those of the transmission apparatus shown in FIGS. 7, 8 and 9. Parts and elements identical to those of FIGS. 7, 8 and 9 are marked with the same reference characters and therefore need not be described in detail.

Operation of the transmission apparatus thus arranged will be described below. The transmission apparatus shown in FIGS. 7, 8 and 9 will be described initially. An analog information signal, such as a video signal or the like, is input to the information signal input terminal 1 and converted by the A/D converting unit 2 into a digital signal. Then, the digital video signal is input to the information signal frame constructing unit 3 in the transmission apparatus 32 from the digital information signal input terminal 10. In the information signal frame constructing unit 3, the stuff control unit 13 effects the speed difference detection and the stuff control, the information signal speed converting unit 11 effects the speed conversion to the interface speed and the stuff insertion and the information signal header synthesizing unit 12 effects the addition of the information signal header 52, such as the stuff control information or the like, respectively. The signal thus converted into the interface speed is input to the transmission line frame constructing unit 4. At that time, information signal frame control information, such as the header addition position or the like, and the interface signal clock are transmitted from the transmission line frame constructing unit 4 to the information signal frame constructing unit 3. In the transmission line frame constructing unit 4, the interface signal speed converting unit 15 effects the speed conversion to the transmission line speed and the transmission line header synthesizing unit 16 effects the addition of the transmission line header 51. Thus, a signal is transmitted from the transmission line output terminal 20 to the transmission line 5. The signal on the transmission line 5 is arranged as the transmission line frame 56 shown in FIG. 6 and then transmitted.

In the reception apparatus 33, the transmission line signal from the transmission line input terminal 21 is input to the transmission line frame analyzing unit 6, and the frame synchronization of the transmission line frame 56 is established by the transmission line frame synchronization detection protecting unit 22. The signal that had been converted by the interface signal speed converting unit 24 into the interface speed is input to the information signal frame analyzing unit 7 together with the frame control information generated by the transmission line frame control unit 22 and the interface signal clock generated by the interface signal clock generating unit 25. The information signal frame analyzing unit 7 separates the information signal header 52 by the frame control information, and the stuff control unit 28 effects the stuff control. Then, the digital information signal is restored by the information signal speed converting unit 29 and the information signal clock generating unit 30. The digital information signal is transmitted from the digital information signal output terminal 31 to the D/A converting unit 8. The D/A converting unit 8 restores the original analog information signal and outputs the same from the information signal output terminal 9.

The transmission apparatus shown in FIGS. 11, 12 and 14 will be described next. Initially, an analog information signal, such as a video signal or the like, is input to the information signal input terminal 1 and converted by the A/D converting unit 2 into a digital signal. Then the digital signal is input to the information signal frame constructing unit 3 in the transmission apparatus 32 from the digital information signal input terminal 10. In the information signal frame constructing unit 3, the stuff control unit 13 effects the speed difference detection and the control of the stuff insertion, the information signal speed converting unit 11 effects the speed conversion to the interface speed, the maintenance of the header area and the stuff insertion, and the information signal header synthesizing unit 12 effects the addition of the information signal header 61, such as the information signal frame synchronizing information, the stuff control information or the like, respectively. The signal thus converted into the interface speed is input to the transmission line frame constructing unit 4 under the condition that it constructs the information signal frame 65. At that time, while the interface signal clock is transmitted from the transmission line frame constructing unit 4 to the information signal frame constructing unit 3, information signal frame control information, such as header addition position information to the information signal header synthesizing unit 12, frame length information and intraframe data amount information to the stuff control unit 13, are generated by the information signal frame control unit 14. In the transmission line frame constructing unit 4, the interface signal speed converting unit 15 effects the speed conversion to the transmission line speed and the transmission line header synthesizing unit 16 effects the addition to the transmission line header 66, thereby a signal being transmitted to the transmission line 5 from the transmission line output terminal 20. The signal on the transmission line 5 is arranged as the transmission frame 58 shown in FIG. 10.

In the reception apparatus 33, the signal from the transmission line input terminal 21 is input to the transmission line frame analyzing unit 6, and a frame synchronization in the transmission frame 68 is established by the transmission line frame synchronizing detection protecting unit 22. The signal that was converted by the interface signal speed converting unit 24 into the interface speed is input to the information signal frame analyzing unit 7 together with the interface signal clock generated by the interface signal clock generating unit 25. In the information signal frame analyzing unit 7, the information signal frame synchronizing detection protecting unit 26 establishes the frame synchronization of the information signal frame 65 independently of the transmission line frame 68. The information signal header 61 is separated by the information signal frame control information generated by the information signal frame control unit 27, and the stuff is removed by using the stuff control information provided within the information signal header 61 under the control of the stuff control unit 28. Then, the digital information signal clock is restored by the information signal clock generating unit 30 and the header area and the stuff are removed by the information signal speed converting unit 29, thereby digital information signal data being restored. The digital information signal data thus restored is transmitted to the D/A converting unit 8 from the digital information signal output terminal 31. The D/A converting unit 8 restores the original analog information signal and outputs the same from the information signal output terminal 9.

As described above, according to the conventional transmission method and apparatus, in the example shown in FIGS. 6, 7, 8 and 9, the information signal header can be separated by establishing the frame synchronization of the transmission frame and the information signal can be restored by the stuff information obtained. Similarly, in the example shown in FIGS. 10, 11, 12 and 13, the frame synchronization of the information signal frame is established by the information signal frame synchronizing information provided within the information signal header, whereby the information signal header can be separated and the stuff information can be obtained, thus to restore the information signal.

According to the conventional transmission method, however, in the example shown in FIGS. 6, 7, 8 and 9, the information signal is transmitted at the frame unit of the transmission line so that a stuff ratio is uniquely determined and a residual jitter is uniquely determined by the frame arrangement of the transmission line. There is then the problem that the residual jitter is increased depending upon the combination of a transmission frame length, transmission rate and an information speed. By way of example, a characteristic curve B in FIG. 5 shows an input frequency fluctuation versus residual jitter characteristic obtained when a video signal that had been digitized at a sampling frequency 14.31818 MHz and a quantization bit of 10 bits is transmitted on the transmission line based on the synchronous digital hierarchy network as an information signal. A method of calculating a residual jitter characteristic is reported in a paper Vol. 58, No. 8 (1975), Part A, pp. 538 to 545 edited by the Institute of Electronics, Information and Communication Engineers of Japan. Study of recent reports reveals that the increase of such residual jitter exerts a bad influence on the phase characteristic of an information signal to be transmitted. Particularly, in the video transmission system, the residual jitter appears as noise caused when a phase of a color subcarrier is modulated, and deteriorates a picture quality (e.g., pp. 287 to 294, a paper Vol. 57, No. 4 (1974), Part A, edited by the Institute of Electronics, Information and Communication Engineers of Japan).

In the example shown in FIGS. 10, 11, 12 and 13, the information signal frame that is independent of the transmission frame is constructed and the stuff control is carried out at the unit of the information signal frame, whereby the increase of the residual jitter can be avoided regardless of the combination of the frame arrangement of the transmission line, the transmission rate and the information speed. By way of example, a characteristic curve A in FIG. 5 shows an input frequency fluctuation versus residual jitter characteristic obtained when a digital video signal having a sampling frequency 14.31818 MHz and a quantization bit of 10 bits is transmitted on the transmission line based on the synchronous digital hierarchy as an information signal.

In the example shown in FIGS. 10, 11, 12 and 13, because the position of the information signal frame within the transmission line frame is not fixed, the information signal frame synchronizing information within the information signal header must be generated by the information signal frame constructing unit 3 in the transmission apparatus 32. Also, the frame synchronization of the information signal frame must be established by capturing the information signal frame synchronizing information within the information signal header by the information signal frame analyzing unit 7 in the reception apparatus 33. There is then the problem that the scale of the required circuit is increased.

Furthermore, "A Development for High Quality Video Transmission System Based on SDH", ITEJ Technical Report Vol. 16, pp. 61-66, Oct. 1992 has proposed a transmission system based on the SDH. This previously-proposed transmission system uses a transmission frame (STM-1, VC-4 and C-4 bulk) based on the SDH and a frame formed of a video frame and an audio frame. This technical literature describes that areas within the VC-4 are assigned as shown in FIG. 14 and the following three systems are considered for the arrangement of the video frame considering (a) residual jitter characteristic, (b) a difference (capacity of vacant area) between a transmission rate and an information speed and (c) a frame synchronization method:

(A) A video frame that is not related to the VC-4 is constructed and a video frame synchronization on the reception side is established by hunting a frame pattern;

(B) A video frame synchronized with the VC-4 is constructed and a video frame synchronization is made common to the frame synchronization of the VC-4; and (C) A video transmission that was assigned to the inside of the VC-4 per se is treated as a video frame.

The aforesaid technical literature has proposed as the system (B) a video frame shown in FIG. 15, i.e., a video frame having a frame length of 250 bytes in which a video transmission area of one line of the C-4 bulk is taken at the unit.

SUMMARY OF THE INVENTION

It is therefore an object of the present invention to provide a digital signal transmission method, a digital signal transmission and reception apparatus and a digital signal transmission apparatus in which a residual jitter can be prevented from being increased and in which a circuit scale of the apparatus can avoid being increased.

According to an aspect of the transmission method of the present invention, in order to attain the aforesaid object, a transmission frame includes a transmission frame used as a signal processing unit on a transmission line, an information signal frame used as a signal processing unit when information is input to and output from the transmission line, and an information signal header which is a control area of the information signal frame. A transmission apparatus includes a transmission frame constructing unit formed of an information signal converting unit, a stuff control unit, an information signal frame control unit, and an information signal header synthesizing unit, and a transmission line frame constructing unit formed of a transmission clock generating unit, an interface signal clock generating unit, an interface signal speed converting unit, a transmission line frame control unit and a transmission line header synthesizing unit. A reception apparatus includes a transmission line frame analyzing unit formed of a transmission line frame synchronization detection protecting unit, a transmission line frame control unit, an interface signal speed converting unit, and an interface signal clock generating unit, and an information signal frame analyzing unit formed of an information signal frame synchronization protecting unit, an information signal frame control unit, a stuff control unit, an information signal speed converting unit, and an information signal clock generating unit. In the transmission apparatus, a synchronization between a transmission line frame and an information signal frame is established by inputting information signal frame position information generated in the transmission line frame control unit provided within the transmission line frame constructing unit into the information signal frame control unit provided within the information signal frame constructing unit, whereby n (n is a positive integer which is a divisor of a length of area used to transmit data within the transmission line frame) information signal frames having a length which results from dividing a length of an area used to transmit data within the transmission line frame by n are accommodated at an arbitrary position distant from the leading byte of the data area provided within the transmission line frame by some bytes. Staff control is carried out at every information signal frame, and a single information signal is transmitted by using n information signal frames. Also, a frame synchronization among n information frames located at a fixed position within the transmission line frame by inputting information signal frame position information generated in the transmission line frame control unit provided within the transmission line frame analyzing unit in the reception apparatus into the information signal frame synchronization protecting unit provided within the information signal frame analyzing unit is established en bloc by using the frame synchronization information of the transmission line frame.

Therefore, according to this method, n (n is a positive integer of a divisor of a length of an area used to transmit data within the transmission line frame) information signal frames having a length which results from dividing a length of an area used to transmit data within the transmission line frame by n are accommodated at an arbitrary position within the data area of the transmission line frame, and stuff control is carried out at every information signal frame. Then, a stuff ratio which is uniquely determined on the basis of a transmission rate, an information speed and a length of the information signal frame serving as the unit length of stuff control is varied by changing the frame number n, whereby a residual jitter can be prevented from being increased without increasing a circuit scale.

BRIEF DESCRIPTION OF THE DRAWINGS

FIG. 14 is a diagram showing how areas are assigned within a VC-4 according to a third prior-art example; and FIG. 15 is a diagram showing a format of a video frame according to the third prior-art example.

DETAILED DESCRIPTION OF THE PREFERRED EMBODIMENTS

Figure 1:
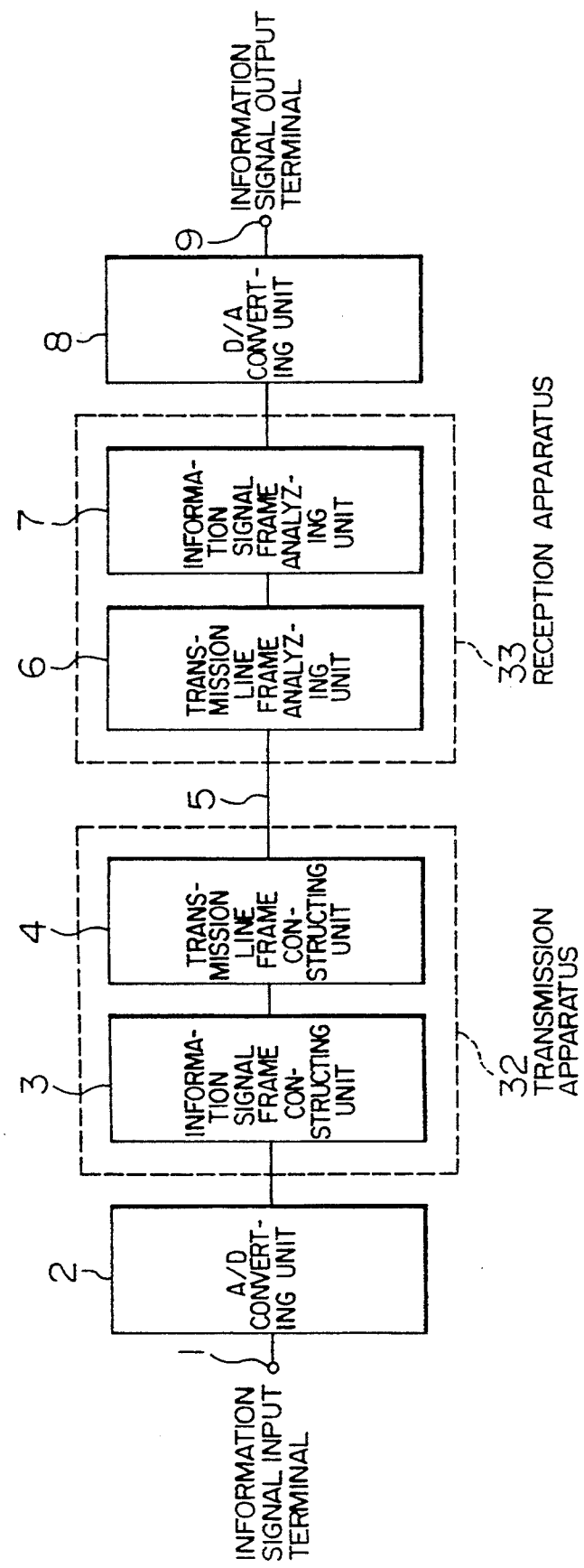
FIG. 1 is a block diagram showing an overall arrangement of a transmission apparatus according to an embodiment of the present invention.
Figure 2:
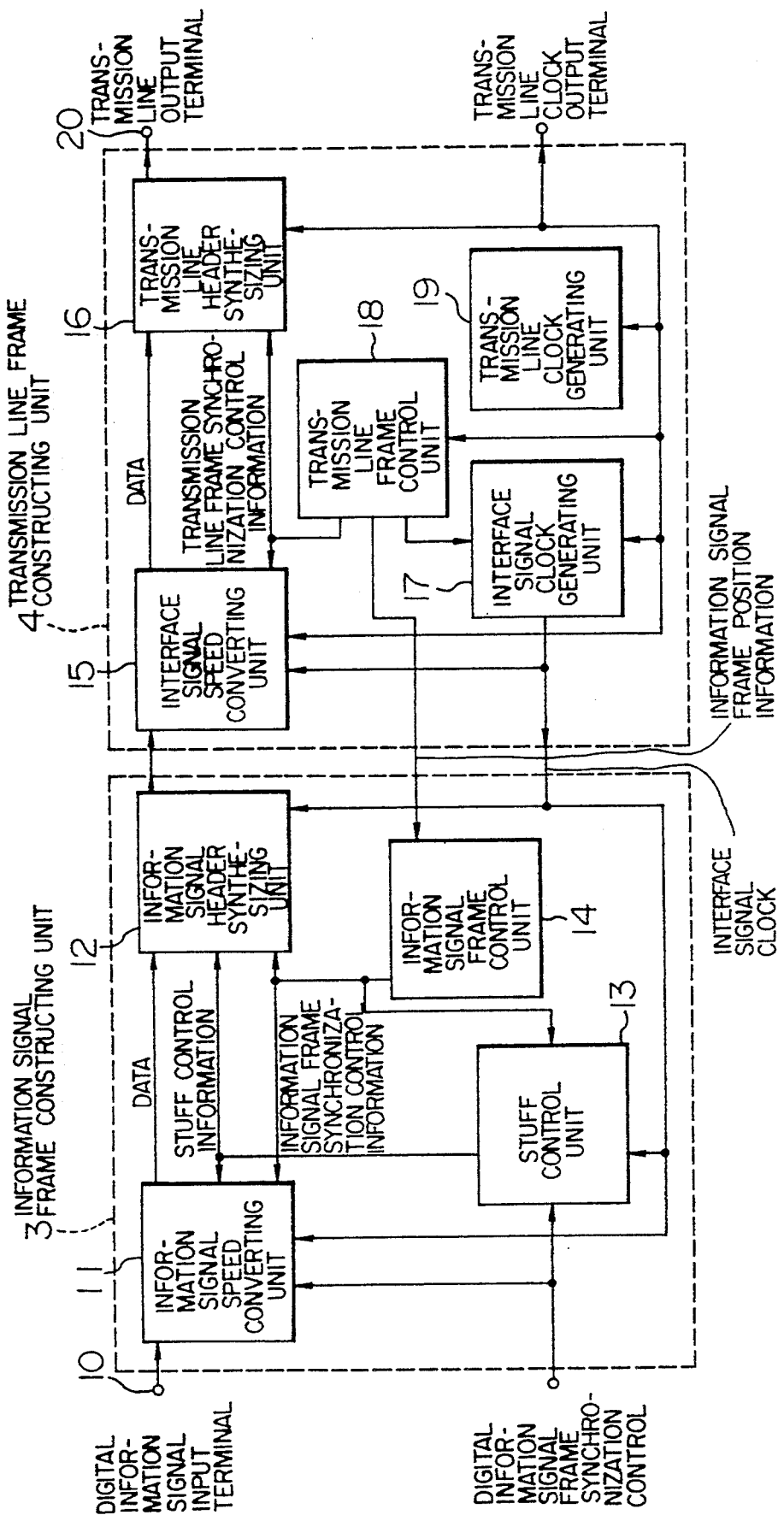
FIG. 2 is a block diagram showing an arrangement of a transmission apparatus according to an embodiment of the present invention.
Figure 3:
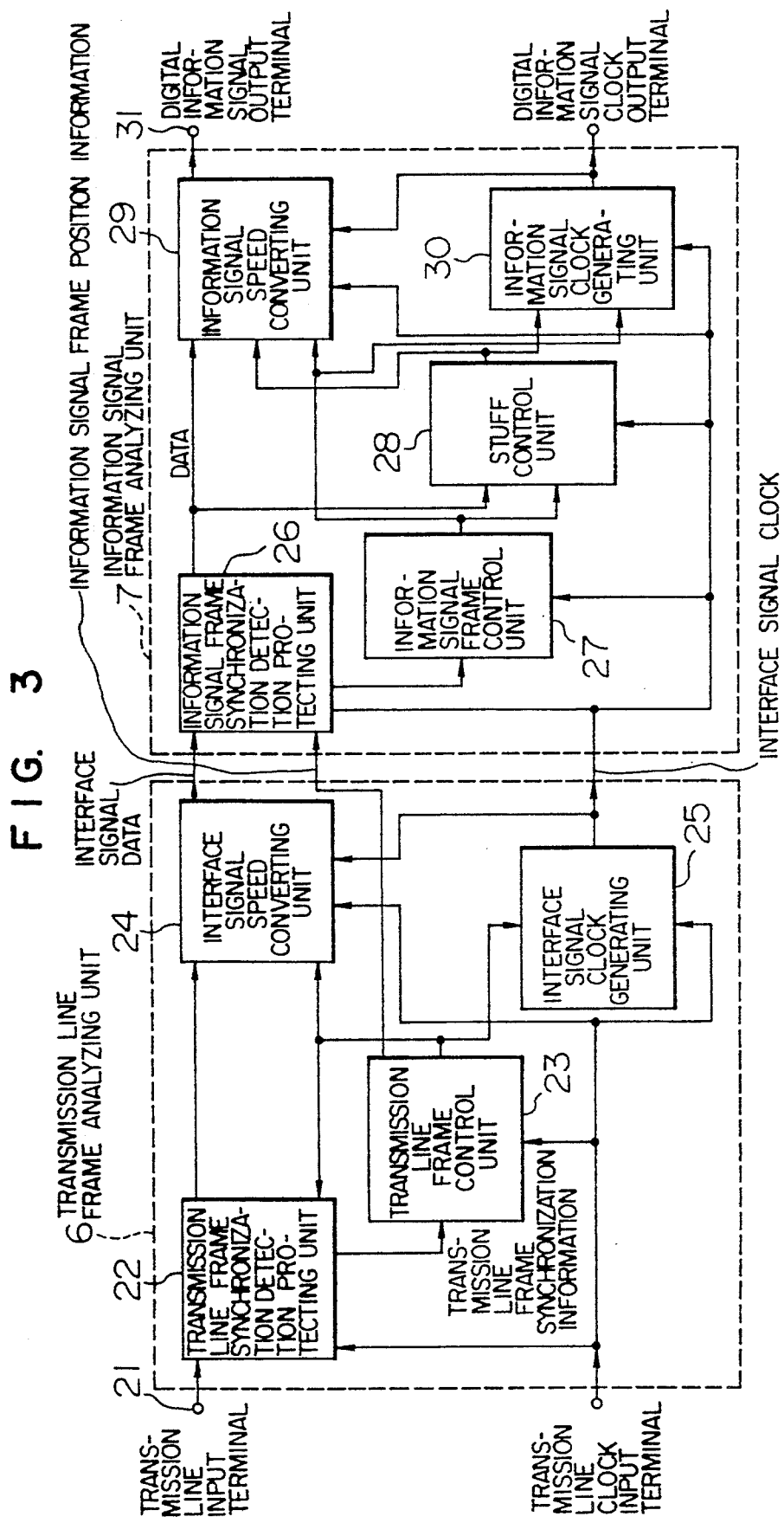
FIG. 3 is a block diagram showing an arrangement of a reception apparatus according to an embodiment of the present invention.
Figure 4:
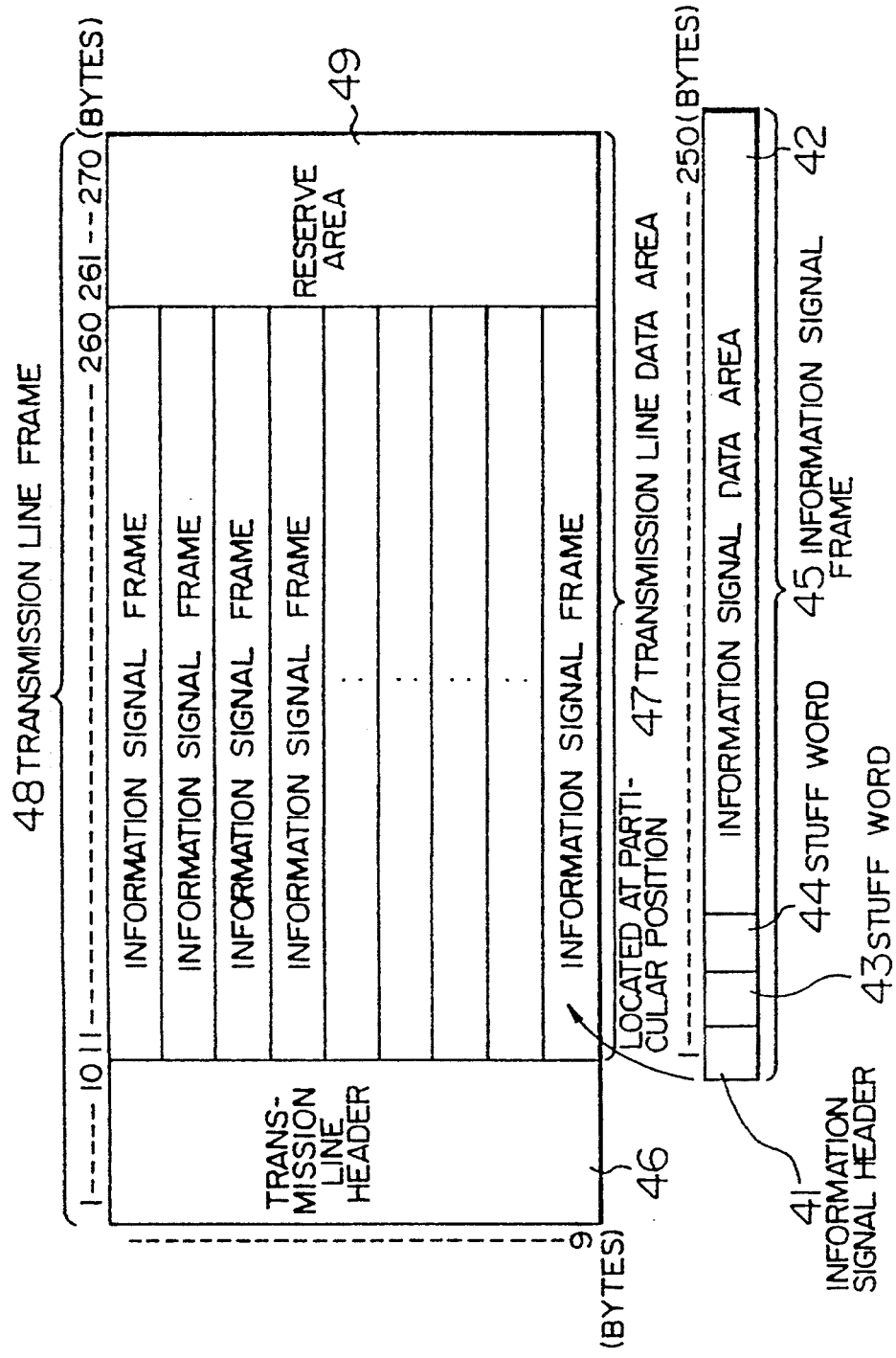
FIG. 4 is a diagram showing a format of a transmission frame according to an embodiment of the present invention.
Figure 5:
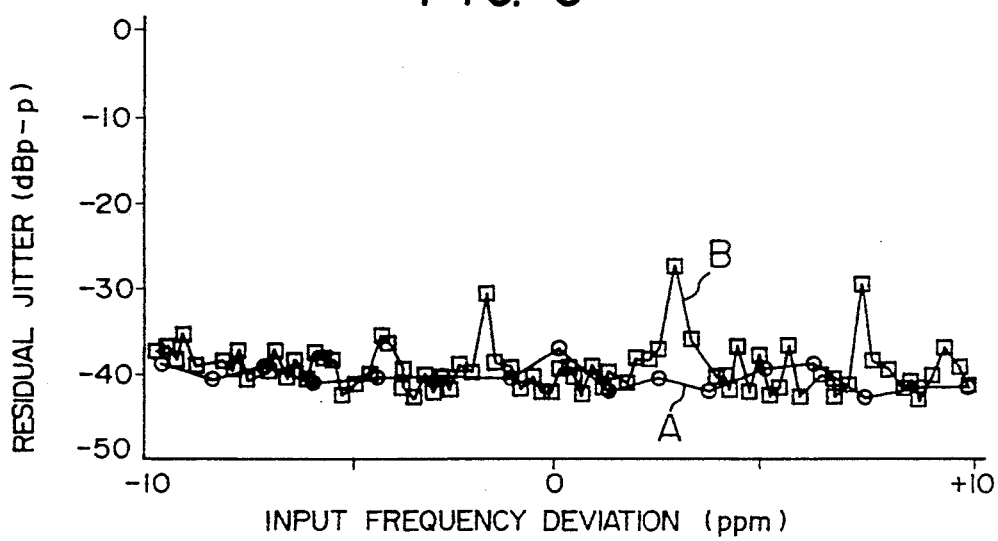
FIG. 5 is a diagram showing inventive and prior-art residual jitter characteristic curves.
Figure 6:
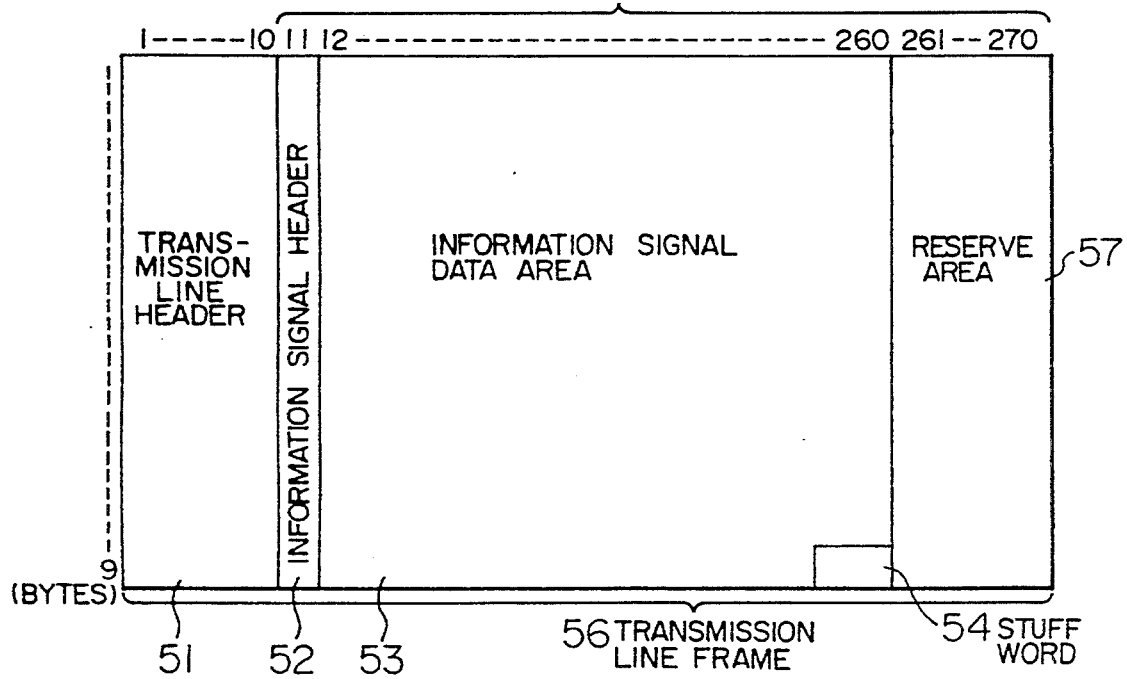
FIG. 6 is a diagram showing a format of a transmission frame according to a first prior-art example.
Figure 7:
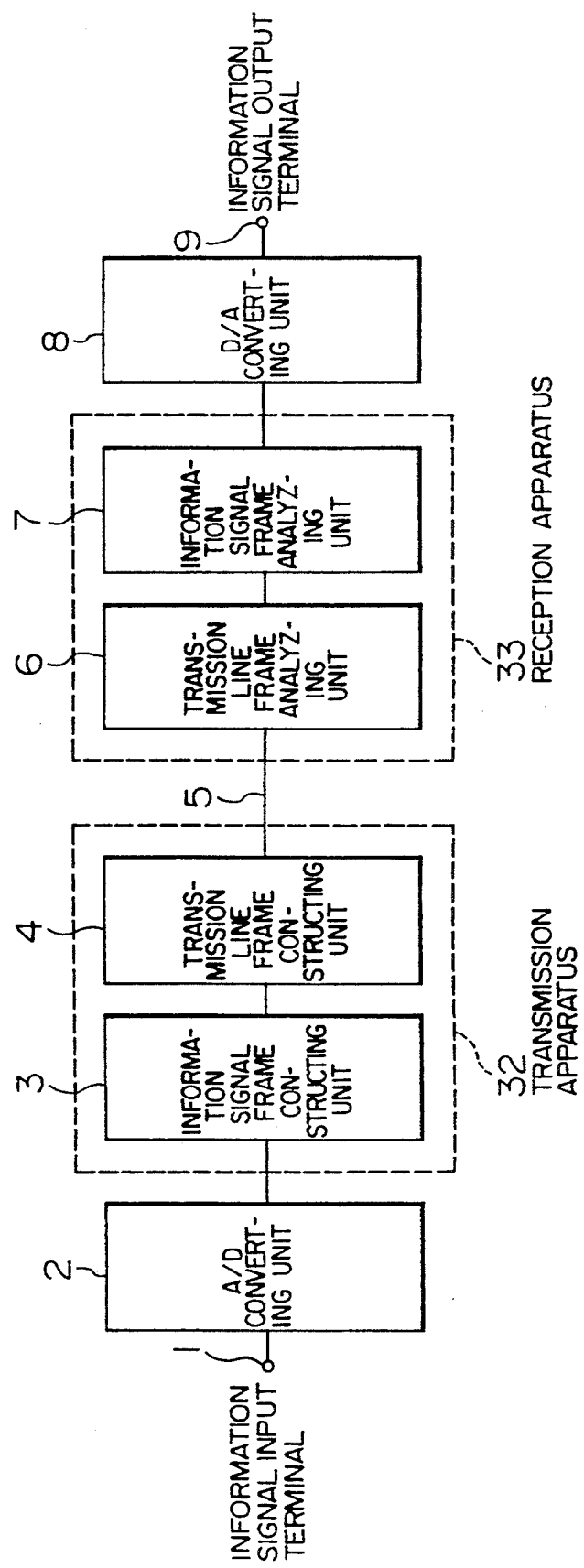
FIG. 7 is a block diagram showing an overall arrangement of a transmission apparatus according to the first prior-art example.
Figure 8:
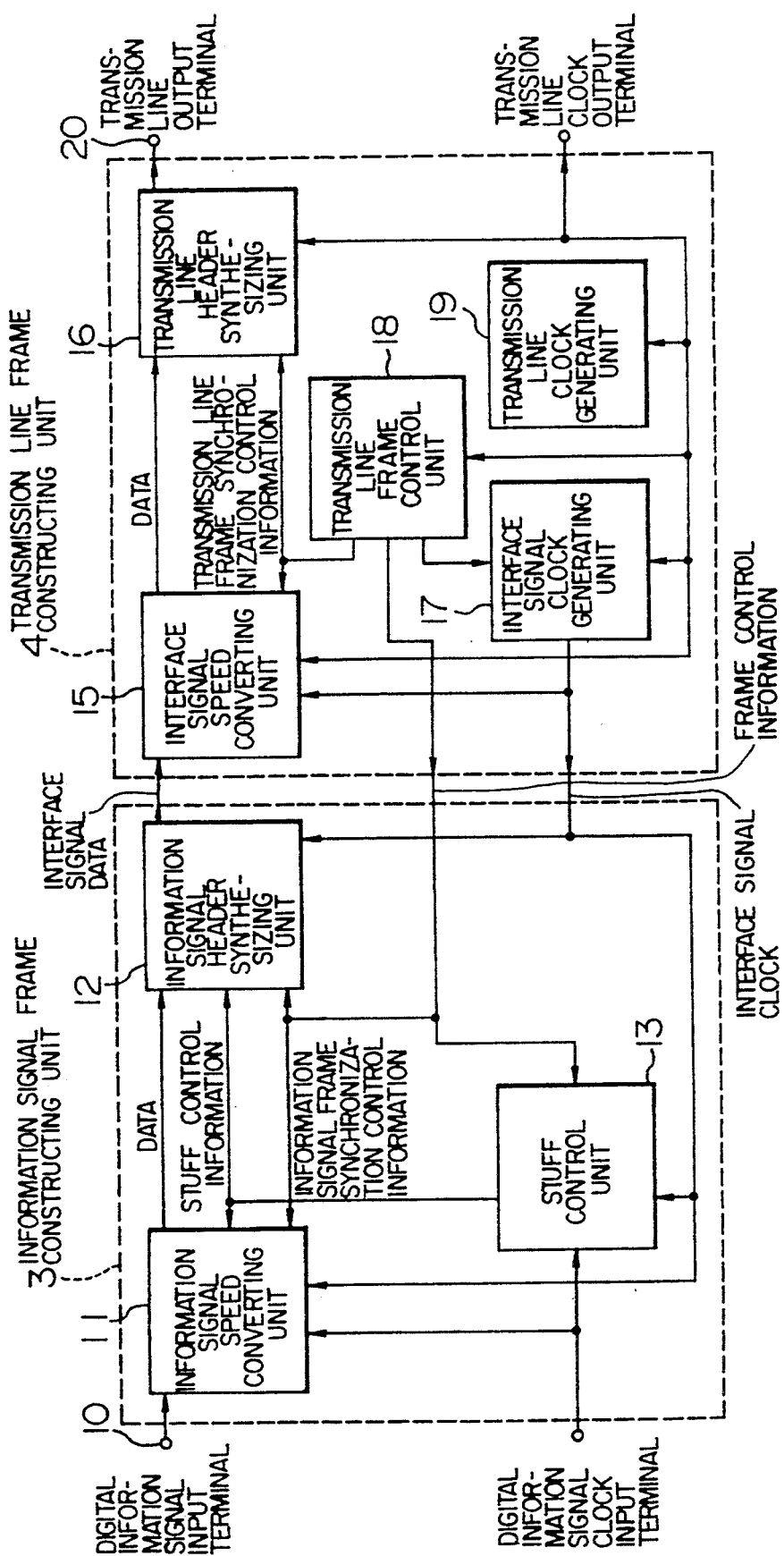
FIG. 8 is a block diagram showing an arrangement of a transmission apparatus according to the first prior-art example.
Figure 9:
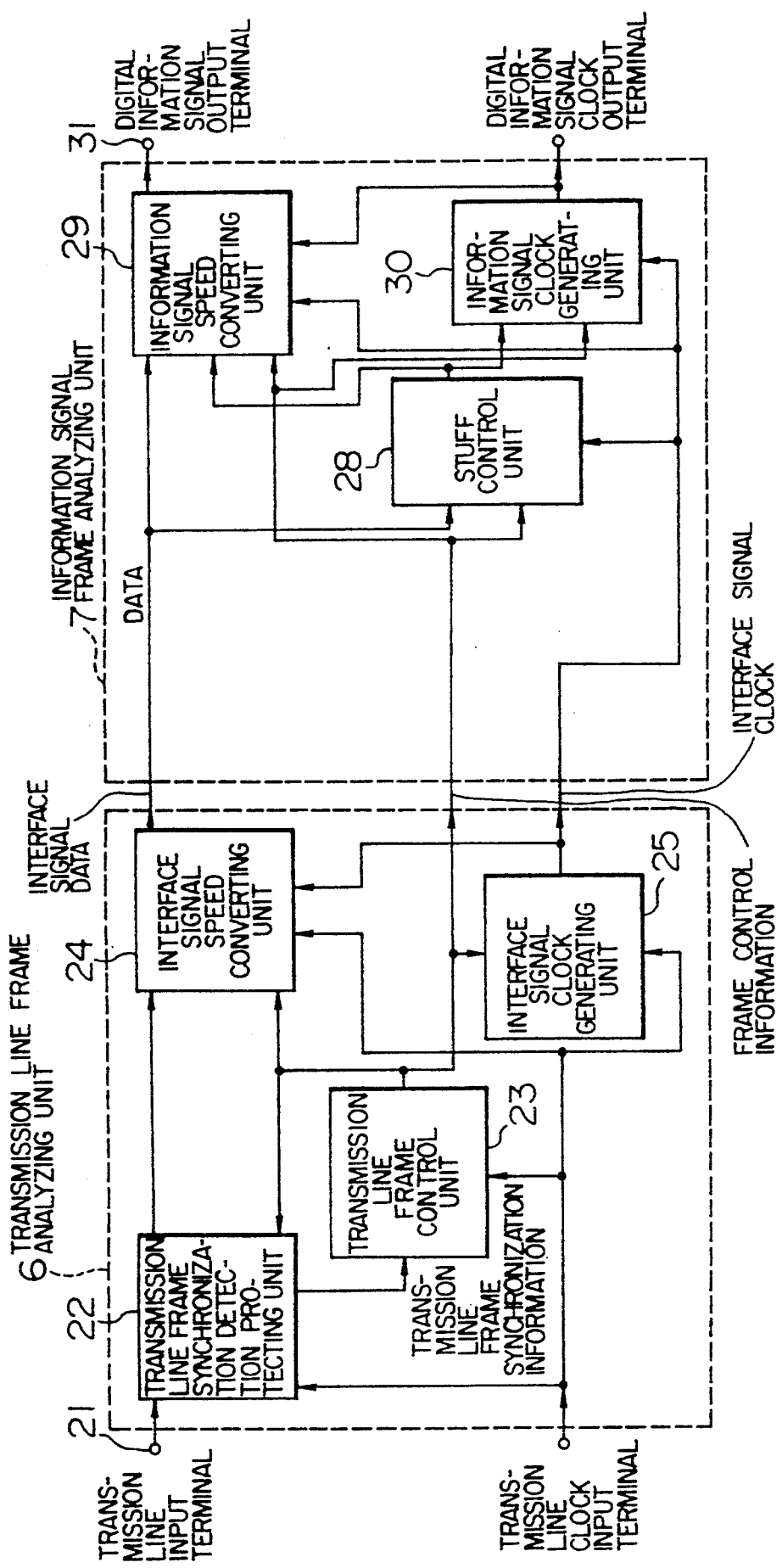
FIG. 9 is a block diagram showing an arrangement of a reception apparatus according to the first prior-art example.
Figure 10:
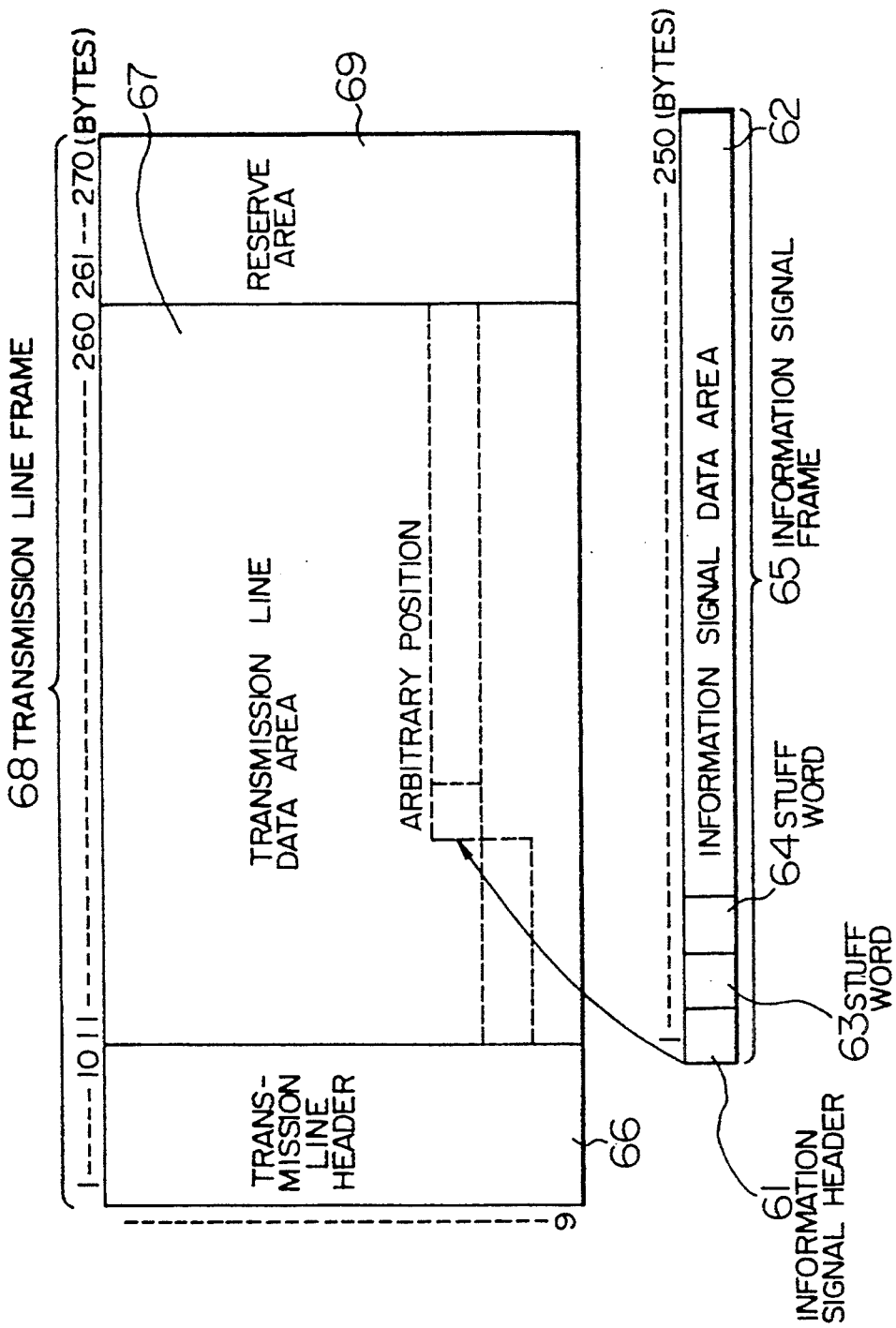
FIG. 10 is a diagram showing a format of a transmission frame according to a second prior-art example.
Figure 11:
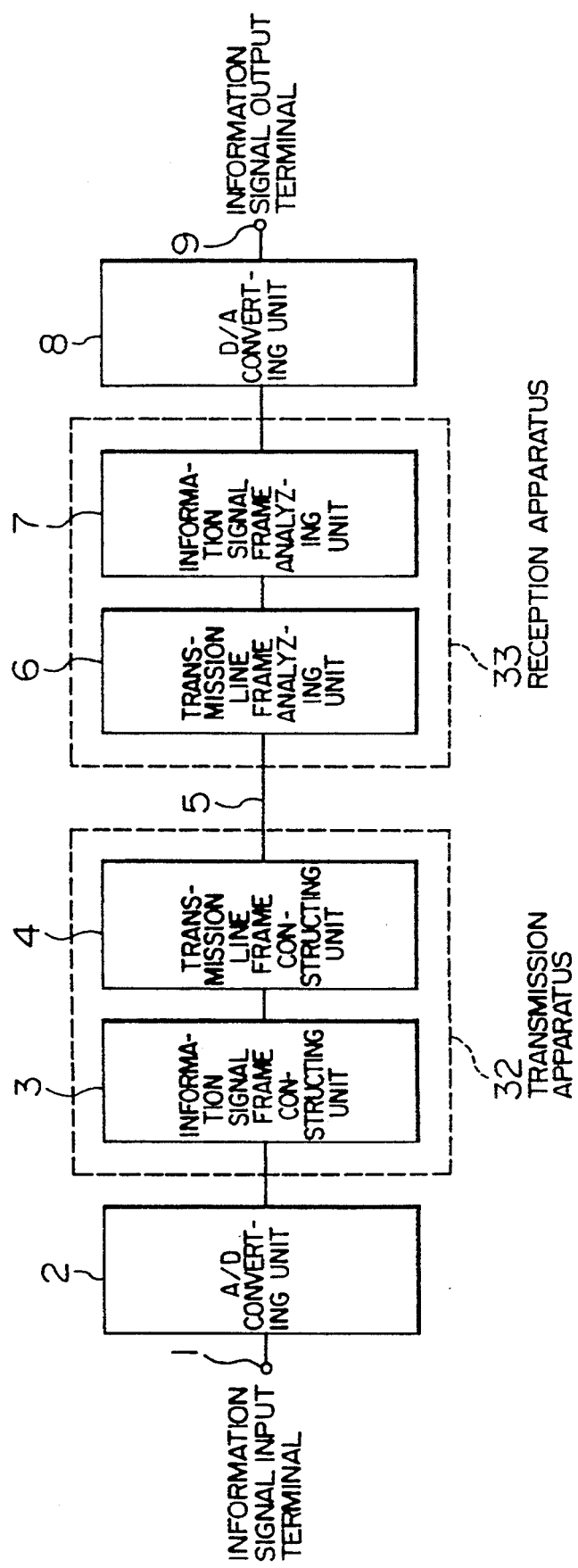
FIG. 11 is a block diagram showing an overall arrangement of a transmission apparatus according to the second prior-art example.
Figure 12:
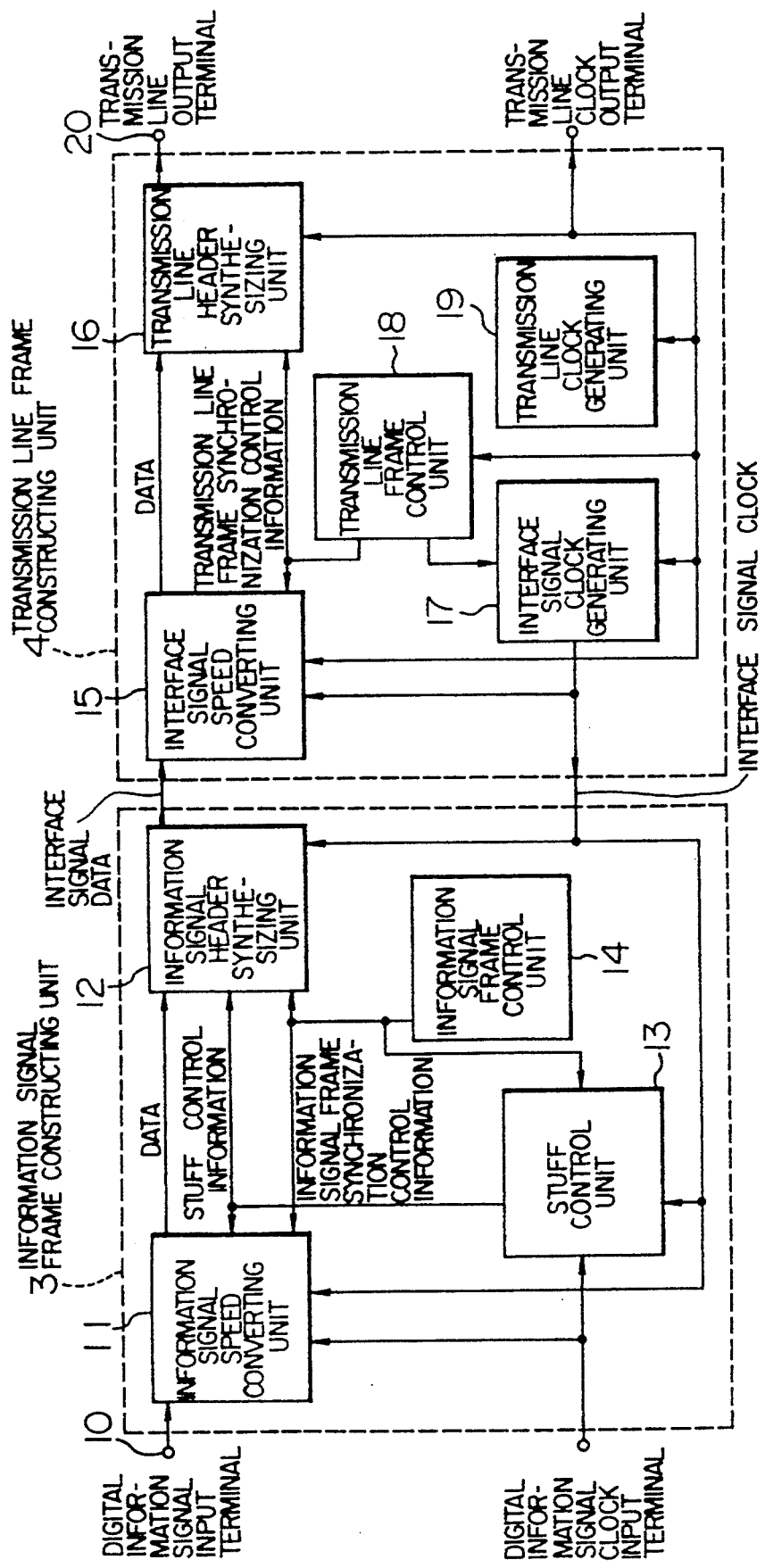
FIG. 12 is a block diagram showing an arrangement of a transmission apparatus according to the second prior-art example.
Figure 13:
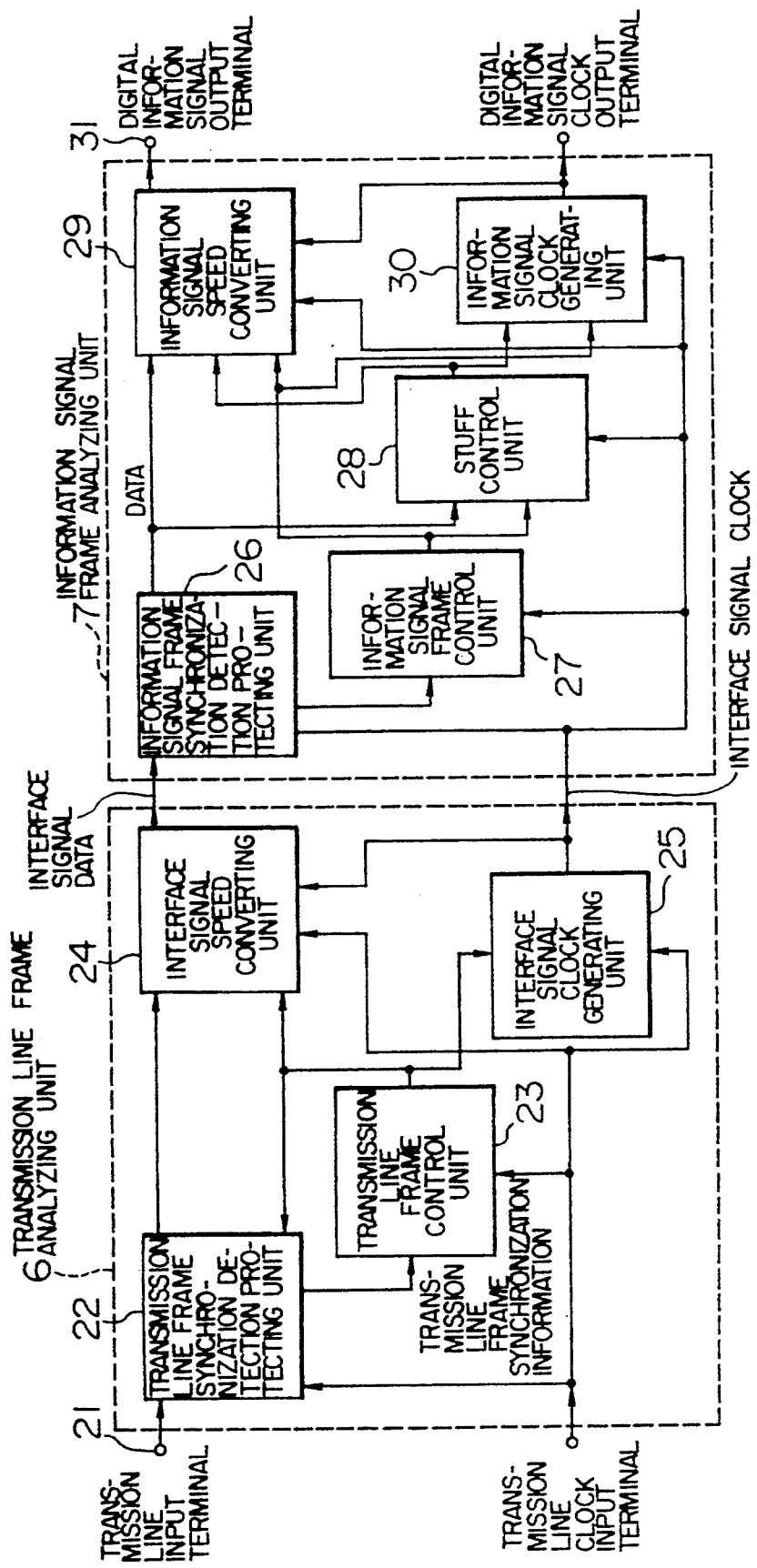
FIG. 13 is a block diagram showing an arrangement of a reception apparatus according to the second prior-art example.

FIGS. 1 to 3 show an arrangement of a digital signal transmission apparatus according to an embodiment of the present invention. FIG. 4 shows an example of a format of a transmission frame on a transmission line based on the synchronous digital hierarchy in a digital signal transmission method according to the present invention. The digital signal transmission apparatus according to this embodiment is fundamentally the same in arrangement as that of the prior art shown in FIGS. 11, 12 and 13 and like elements and parts are marked with the same references.

As shown in FIG. 1, there is provided the input terminal to which there is input a video signal as an information signal. The analog video signal applied to the input terminal 1 is converted by the A/D converting unit 2 into a digital video signal. This digital video signal is supplied to the information frame constructing unit 3 whose output signal is supplied to the transmission line frame constructing unit 4. The information signal frame constructing unit 3 and the transmission line frame constructing unit 4 constitute the transmission apparatus 32. There is provided the transmission line 5 and the arrangement of the transmission signal thereof conforms to the synchronous digital hierarchy. There are provided the transmission line frame analyzing unit 6 and the information signal frame analyzing unit 7. The transmission line frame analyzing unit 6 and the information signal frame analyzing unit 7 constitute the reception apparatus 33. An output signal of the reception apparatus 33 is converted by the D/A converting unit 8 into an analog signal, and this analog video signal is output from the information signal output terminal 9.

FIG. 2 shows an arrangement of the transmission apparatus 32 shown in FIG. 1. As shown in FIG. 2, there is provided the input terminal 10 to which there is supplied a digitized information signal. The information signal speed converting unit 11 effects the speed conversion on the input digitized information signal. There are provided the information signal header synthesizing unit 12 and the stuff control unit 13. The information signal speed converting unit 11, the information signal header synthesizing unit 12 and the stuff control unit 13 constitute the information signal frame constructing unit 3. Further, there are provided the information signal frame control unit 14, the interface signal speed converting unit 15 which effects the speed conversion on the input interface signal, the transmission line header synthesizing unit 16, the interface clock generating unit 17 formed of some suitable means, such as a subsidiary oscillator or the like, the transmission line frame control unit 18, and the transmission clock generating unit 19 formed of an independent oscillator. These circuit elements 15 through 19 constitute the transmission line frame constructing unit. An output of the transmission line frame constructing unit 4 is delivered from the transmission line output terminal 20.

FIG. 3 shows an arrangement of the reception apparatus shown in FIG. 1. As shown in FIG. 3, there are provided the transmission line input terminal 21, the transmission line frame synchronizing detection protecting unit 22, the transmission line frame control unit 23, the interface signal speed converting unit 24 which outputs the interface signal by effecting the speed conversion on the input signal, and the interface signal clock generating unit 25 formed of some suitable means, such as a subsidiary oscillator or the like. The above circuit elements 22 to 25 constitute the transmission line frame analyzing unit 6. Further, there are shown the information signal frame synchronization protecting unit 26, the information signal frame control unit 27, the stuff control unit 28, the information signal speed converting unit 29 which outputs an information signal by effecting the speed conversion on the input signal, and the information signal clock generating unit 30 formed of some suitable means, such as a subsidiary oscillator or the like. The circuit elements 20 to 30 constitute the information signal frame analyzing unit 7. An output signal from the information signal frame analyzing unit 7 is delivered from the digital information signal output terminal 31.

As shown in FIG. 4, there is provided an information signal header 41 (10-bit length) which includes therein stuff control information of the information signal. There is shown an information signal data area 42 which includes 2 words of stuff words (10-bit length). The information signal header 41, the information signal data area 42 and the stuff words 43, 44 constitute an information signal frame 45. There are provided a transmission line header 46 and a transmission line data area 47. The transmission line data area 47 includes therein a reserve area 49 for future expansion. The transmission line header 46 and the transmission line data area 47 constitute a transmission line frame 48. The information signal frame 45 corresponds to one row (250-byte length) of the transmission line data area 47 and is located within the transmission line data area 47 at its particular position.

Operation of the above-mentioned embodiment will be described below. In accordance with this embodiment, an analog information signal, such as a video signal or the like, is input to the information signal input terminal 1. This analog information signal is converted by the A/D converting unit 2 into a digital signal, and then input to the information signal frame constructing unit 3 in the transmission apparatus 32 from the digital information signal input terminal 10. In the information signal frame constructing unit 3, the stuff control unit 13 detects a speed difference between the information signal clock and the interface signal clock and also effects the stuff insertion to the information signal data, the information signal speed converting unit 11 effects the speed conversion from the information signal speed to the interface signal speed, the maintenance of the information signal header area and the stuff insertion, and the information signal header synthesizing unit 12 effects the addition of the information signal header 41, such as the stuff control information or the like, respectively. The signal that was converted into the interface speed as described above is output from the information signal frame constructing unit 3 under the condition that it constructs the information signal frame 45, and then input to the transmission line frame constructing unit 4. At that time, information signal frame control information, such as the header addition position information to the information signal header synthesizing unit 12 and information signal frame length information and information signal intraframe data amount information relative to the stuff control unit 13 are generated by the information signal frame control unit 14. The interface clock signal and information signal frame position information that instructs the position of the information signal frame within the information transmission area of the transmission line frame 48 are transmitted to the information signal frame constructing unit 3 from the transmission line frame constructing unit 4. By this information signal frame position information, a position at which the information signal frame 45 is located in the transmission frame 48 is determined, and a synchronization between the transmission line frame 48 and the information signal frame 45 is established. In the transmission line frame constructing unit 4, the interface signal speed converting unit 15 effects the speed conversion from the interface speed to the transmission line speed, and the transmission line header synthesizing unit 16 effects the addition of the transmission line header 46. Then, a signal is transmitted to the transmission line 5 from the transmission line output terminal 20. The signal on the transmission line 5 is constructed similarly to the transmission line frame 48 shown in FIG. 4 and then transmitted.

In the reception apparatus 33, the transmission line signal is input to the transmission line frame analyzing unit 6 from the transmission line input terminal 21, and a frame synchronization of the transmission line frame 48 is established by the transmission line frame synchronization detection protecting unit 22. The signal that has been converted from the transmission line speed to the interface speed by the interface signal speed converting unit 24 is output from the transmission line frame analyzing unit 6 together with the interface signal clock generated by the interface signal clock generating unit 25 and the information signal frame position information generated by the transmission line frame control unit 23, and then input to the information signal frame analyzing unit 7. In the information signal frame analyzing unit 7, a position of the information signal that is located at an arbitrary position distant from the leading byte of the data area within the transmission line frame 47 by some bytes is determined by inputting the information signal frame position information to the information signal frame synchronization protecting unit 26 and thus the frame synchronization of the information signal frame 45 is established. Subsequently, the information signal header is separated by the information signal frame control information generated by the information signal frame control unit 27, and the stuff is removed by the stuff control unit 28 on the basis of the information signal frame control information and the stuff control information provided within the information signal header. Then, the digital information clock is restored by the information signal clock generating unit 30 and the information signal header area and the stuff are removed by the information signal speed converting unit 29, whereby the digital information signal data is restored. The digital information signal data thus restored is transmitted to the D/A converting unit 8 from the digital information signal output terminal 31. The D/A converting unit 8 restores the original analog information signal, and outputs the same from the information signal output terminal 9.

As described above, according to this embodiment, in the transmission apparatus 33, the synchronization between the transmission line frame 48 and the information signal frame 45 is established by inputting the information signal frame position information generated in the transmission line frame control unit 18 provided within the transmission line frame constructing unit 4 into the information signal frame control unit 14 provided within the information signal frame constructing unit 3, whereby n information signal frames 45 of frame length which results from dividing the length of the area used in the data transmission within the transmission line frame 48 by n are accommodated at an arbitrary position distant from the leading byte of the data area provided within the data area of the transmission line frame 48 by some bytes. Then, the stuff control is effected at every information signal frame 45 and a single information signal is transmitted by using n information signal frames 45. In the reception apparatus 33, the information signal frame position information generated in the transmission line frame control unit 23 provided within the transmission line frame analyzing unit 6 is input to the information signal frame synchronization protecting unit 26 provided within the information signal frame analyzing unit 7, whereby a frame synchronization among the n information signal frames 45 located at the fixed position within the transmission line frame 48 is established en bloc by using the frame synchronization information of the transmission line frame 48. Therefore, the stuff rate that is uniquely determined by the transmission rate, the information speed and the length of the information signal frame 45 serving as the unit length of the stuff control can be varied by changing the lengths of individual information signal frames 45 without increasing the circuit scale. Moreover, the information signal can be transmitted by selecting the value of the frame number n which yields the stuff ratio that can prevent the residual jitter from being increased without deteriorating the phase characteristic of the information signal.

To be more concrete, the stuff ratio is determined on the basis of the transmission rate, the information speed and the frame length of the information signal frame by the following equation (1):

$$\text{stuff ratio} = 1 - \text{frame length} \times \frac{\text{information speed}}{\text{transmission speed}} + \left[ \text{frame length} \times \frac{\text{information speed}}{\text{transmission rate}} \right] \quad (1)$$

where $$\left[ \text{frame length} \times \frac{\text{information speed}}{\text{transmission rate}} \right]$$

represents an integer portion of $$\left( \text{frame length} \times \frac{\text{information speed}}{\text{transmission rate}} \right)$$

Further, the equation (1) determines a fluctuation width of the stuff ratio relative to the fluctuation width of the input frequency on the basis of the frame length of the information signal frame as in the following equation (2):

$$\text{stuff ratio fluctuation width} = 1 - \text{frame length} \times \text{input frequency fluctuation width} + [\text{frame length} \times \text{input frequency fluctuation width}] \quad (2)$$

where [frame length×input frequency fluctuation width] represents an integer portion of (frame length×input frequency fluctuation width).

The frame length of the information signal frame can be changed by selecting the value of n and the information signal frame which can avoid the residual jitter increasing area can be constructed. By way of example, according to this embodiment, a characteristic curve A in FIG. 3 shows an input frequency fluctuation versus residual jitter characteristic obtained when a video signal digitized at the sampling frequency of 14.31818 MHz and at the quantization bit of 10 bits is transmitted on the transmission line based on the synchronous digital hierarchy as an information signal. In this embodiment, because the portion which results from removing the reserve area 49 from the transmission line data area 47 in FIG. 4 is formed of 2250 bytes, an area which is not used for transmitting an information signal, i.e., area that can be used for the information signal header 41 becomes 102.275 bits (about 12.78 bytes). Assuming now that 1 word (10 bits) of the information signal header 41 is added per frame of the information signal frame, then the maximum value of n becomes 10. Therefore, n may be 1, 2, 3, 5, 6, 9 and 10. When the input frequency fluctuation versus residual jitter characteristic is calculated for these values of n and a proper value of n is selected, it is possible to construct the information signal frame which can avoid a residual jitter increasing area. In this embodiment, an information signal frame having a frame length of 250 bytes (effective frame length is 270 bytes for the transmission line) is constructed by properly selecting the value of n, i.e., n=9. While the characteristic of this information signal frame is the same as that of the conventional apparatus shown in FIG. 11, according to the present invention, the same characteristic can be realized with a smaller circuit scale by establishing en bloc the frame synchronization of the information signal frame located at the fixed position within the transmission line frame by effectively utilizing the frame synchronization information of the transmission line frame.

While all informations necessary for effecting the stuff control, such as a length of the information signal frame, a data amount of the information signal frame and the insertion position of the stuff word in the format of the information signal frame are supplied to the stuff control unit 13 of the transmission apparatus 32 and the stuff control unit 28 of the reception apparatus from the outside as described above, the present invention is not limited thereto and the above informations may be held within the stuff control units 13, 28 in advance. In this case, the circuit arrangement can be further simplified. If the data area length within the transmission line frame had no proper divisor and the proper value of n in which the residual jitter can be prevented from being increased had not been obtained, the length of the area used in actual data transmission in the data area would be changed by providing more than one fixed stuff in the data area of the transmission line frame and n information signal frames would be constructed. In this case, the range in which the stuff ratio can be set can be further enlarged by enlarging the range of selecting the values of n. In this selection range, the value of n which can provide a stuff ratio at which the residual jitter can be prevented from being increased can be selected.

According to the present invention, as will be clear from the above description, n information signal frames each having a length which results from dividing the length of the area used in data transmission within the transmission line frame by n (n is a positive integer which is a divisor of a length of an area used in data transmission within the transmission line frame) are located at an arbitrary position within the data area of the transmission line frame. Then, the stuff control is carried out at every information signal frame, and the stuff ratio which is uniquely determined on the basis of the transmission rate, the information speed and the information signal frame length serving as the unit length of the stuff control is varied by changing the frame number n, whereby the residual jitter can be prevented from being increased without increasing the circuit scale and the information signal can be transmitted without deteriorating the quality.

What is claimed is:

1. A digital signal transmission method for transmitting an information signal which is not synchronized with a transmission line signal by framing and stuff synchronizing into an information signal frame synchronized with said transmission line signal by using a transmission line frame as a unit of signal processing on a transmission line for transmitting information, an information signal frame as a unit of signal processing unit used when information is input to and output from said transmission line and an information signal header which is a control area of said information signal frame, comprising the steps of:

dividing a length of a specified area for use of data transmission in said transmission line frame into n divisions (where n is a positive integer of a divisor of a length of an area used in data transmission within a transmission line frame);

locating n information signal frames having the same length of said division at a position having an arbitrary distance from a head within a data area of said transmission line frame;

effecting a stuff control at each said information signal frame; and varying a stuff ratio which is uniquely determined on the basis of a transmission rate, an information speed and an information signal frame length serving as a unit length of stuff control by varying a frame number n, whereby residual jitter is prevented from increasing.

2. A digital signal transmission method according to claim 1, wherein said transmission line is based on a synchronous digital hierarchy, said information signal is a digital video signal (143.1818 Mb/s) quantized by a sampling clock four times as high as an NTSC video subcarrier (3.579545 MHz) in a 10-bit linear quantization fashion and said digital video signal is accommodated in a data transmission area set in a virtual container VC-4 having an information format of said synchronous digital hierarchy for transmission, and wherein said frame number n is set to 9.

3. A digital signal transmission apparatus comprising:

(a) an information signal frame constructing unit including:

an information signal speed converting unit to which an information signal is input, a stuff control unit for effecting a stuff insertion operation in said information signal speed converting unit and a control operation of stuff control information provided within an information signal header, an information signal header synthesizing unit for synthesizing said information header to output data of said information signal speed converting unit, and an information signal frame control unit for generating frame control information that is supplied to said stuff control unit and said information signal header synthesizing unit, and (b) a transmission line frame constructing unit including:

a transmission line clock generating unit, an interface signal clock generating unit, an interface signal speed converting unit to which an interface signal is input, a transmission line frame control unit for generating a transmission line frame control information, and a transmission line header synthesizing unit for synthesizing transmission line headers, wherein said transmission line frame control unit within said transmission line frame constructing unit generates information signal frame position information, said information signal frame is located at a predetermined position within said transmission line frame by instructing a position of an information signal frame within said transmission line frame by inputting said information signal frame position information to said information signal frame control unit provided within said information signal frame constructing unit, and said information signal frame is adapted to be framed in with information to be transmitted.

4. A digital signal reception apparatus for restoring an information signal received through a transmission line by frame analyzing said information signal, said apparatus comprising:

a transmission line frame analyzing unit including:

(a) a transmission line frame synchronization detection protecting unit for establishing a frame synchronization of a transmission line signal,
a transmission line frame control unit for generating transmission line frame control information,
an interface signal speed converting unit for outputting an interface signal, and
an interface signal clock generating unit; and
(b) an information signal frame analyzing unit including:
an information signal frame synchronization protecting unit for establishing a frame synchronization of an information signal,
an information signal frame control unit for generating information signal frame control information,
an information signal speed converting unit for outputting an information signal,
a stuff control unit for controlling a stuff removal operation in said information signal speed converting unit by stuff control information provided within said information signal header, and
an information signal clock generating unit,
wherein said transmission line frame control unit provided within said transmission line frame analyzing unit generates information signal frame position information by using frame synchronization information of said transmission line frame, and said information signal frame synchronization protecting unit provided within said information signal frame analyzing unit inputs said information signal frame position information and instructs a position of the information signal frame from predetermined positions located within said transmission line frame, thereby establishing frame synchronization of said information signal frame.

5. A digital video signal transmission apparatus comprising:
(a) a transmission line based on a synchronous digital hierarchy;
(b) an analog-to-digital converting unit;
(c) a digital signal transmission apparatus comprising:
(i) an information signal frame constructing unit including:
an information signal speed converting unit to which an information signal is input,
a stuff control unit for effecting a stuff insertion operation in said information signal speed converting unit and a control operation of stuff control information provided within an information signal header,
an information signal header synthesizing unit for synthesizing said information header to output data of said information signal speed converting unit, and
an information signal frame control unit for generating frame control information that is supplied to said stuff control unit and said information signal header synthesizing unit, and
(ii) a transmission line frame constructing unit including:
a transmission line clock generating unit,
an interface signal clock generating unit,
an interface signal speed converting unit to which an interface signal is input,
a transmission line frame control unit for generating a transmission line frame control information, and
a transmission line header synthesizing unit for synthesizing transmission line headers,
wherein said transmission line frame control unit within said transmission line frame constructing unit generates information signal frame position information, said information signal frame is located at a predetermined position within said transmission line frame by instructing a position of an information signal frame within said transmission line frame by inputting said information signal frame position information to said information signal frame control unit provided within said information signal frame constructing unit, and said information signal frame is adapted to be framed in with information to be transmitted;
(d) a digital signal reception apparatus for restoring an information signal received through a transmission line by frame analyzing said information signal, said apparatus comprising:
a transmission line frame analyzing unit including:
(i) a transmission line frame synchronization detection protecting unit for establishing a frame synchronization of a transmission line signal,
a transmission line frame control unit for generating transmission line frame control information,
an interface signal speed converting unit for outputting an interface signal, and
an interface signal clock generating unit;
(ii) an information signal frame analyzing unit including:
an information signal frame synchronization protecting unit for establishing a frame synchronization of an information signal,
an information signal frame control unit for generating information signal frame control information,
an information signal speed converting unit for outputting an information signal,
a stuff control unit for controlling a stuff removal operation in said information signal speed converting unit by stuff control information provided within said information signal header, and
an information signal clock generating unit,
wherein said transmission line frame control unit provided within said transmission line frame analyzing unit generates information signal frame position information by using frame synchronization information of said transmission line frame, and said information signal frame synchronization protecting unit provided within said information signal frame analyzing unit inputs said information signal frame position information and instructs a position of the information signal frame from predetermined positions located within said transmission line frame, thereby establishing frame synchronization of said information signal frame; and
(e) a digital-to-analog converting unit, wherein a transmission is carried out in a digital signal transmission method for transmitting an information signal which is not synchronized with a transmission line signal by framing and stuff synchronizing into an information signal frame synchronized with said transmission line signal by using a transmission line frame as a unit of signal processing on a transmission line for transmitting information, an information signal frame as a unit of signal processing unit used when information is input to and output from said transmission line and an information signal header which is a control area of said information signal frame, said method comprising the steps of dividing a length of a specified area for use of data transmission in said transmission line frame into n divisions (where n is a positive integer of a divisor of a length of an area used in data transmission within a transmission line frame); locating n information signal frames having the same length of said division at a position having an arbitrary distance from a head within a data area of said transmission line frame; effecting a stuff control at each said information signal frame; and varying a stuff ratio which is uniquely determined on the basis of a transmission rate, an information speed and an information signal frame length serving as a unit length of stuff control by varying a frame number n, whereby residual jitter is prevented from increasing, and wherein said transmission line is based on a synchronous digital hierarchy, said information signal is a digital video signal (143.1818 Mb/s) quantized by a sampling clock four times as high as an NTSC video subcarrier (3.579545 MHz) in a 10-bit linear quantization fashion and said digital video signal is accommodated in a data transmission area set in a virtual container VC-4 having an information format of said synchronous digital hierarchy for transmission, and wherein said frame number n is set to 9.

* * * * *